(12) United States Patent
Chellappa

(10) Patent No.: US 6,350,396 B1
(45) Date of Patent: Feb. 26, 2002

(54) METHOD FOR FABRICATING CARBON-CARBON ARTICLES

(75) Inventor: Venkatesh Chellappa, Schaumburg, IL (US)

(73) Assignee: Veejay Development, Inc., Schaumburg, IL (US)

(*) Notice: Subject to any disclaimer, the term of this patent is extended or adjusted under 35 U.S.C. 154(b) by 0 days.

(21) Appl. No.: 09/108,560

(22) Filed: Jul. 1, 1998

(51) Int. Cl.$^7$ .............................................. C01B 31/00
(52) U.S. Cl. ..................................... 264/29.1; 264/29.7
(58) Field of Search ........................ 264/29.1, 29.4, 264/29.6, 29.7

(56) References Cited

U.S. PATENT DOCUMENTS

| | | | |
|---|---|---|---|
| 4,534,919 A | * | 8/1985 | McAliley et al. .......... 264/29.2 |
| 5,192,471 A | * | 3/1993 | Uemura et al. ............ 264/29.5 |
| 5,205,888 A | * | 4/1993 | Mochida et al. .............. 156/89 |
| 5,294,383 A | * | 3/1994 | Donzac et al. ............. 264/29.2 |

* cited by examiner

Primary Examiner—Christopher A. Fiorilla
(74) Attorney, Agent, or Firm—Dillis V. Allen, Esq.

(57) ABSTRACT

A method of making carbon-carbon pistons and a limited variety of other products also requiring light weight, high strength and high thermal conductivity, and the resulting piston, including the steps of feeding impregnated fibers from spools into a layered bundle of fibers, coating the fibers with a carbonaceous material to form a preform, sleeving the preform with a thermoplastic sleeve, extruding the coated preform, passing the preform through an oven while compacting the preform further, and cutting the preform into standard lengths as the preform exits the furnace and achieves a degree of cool down. The pistons are machined from the cut preforms with the piston axis parallel to the fibers and layers. The pistons include crown, skirt, and wrist pin bosses and the axis of the wrist pin bosses is perpendicular to the fibers and layers.

18 Claims, 2 Drawing Sheets

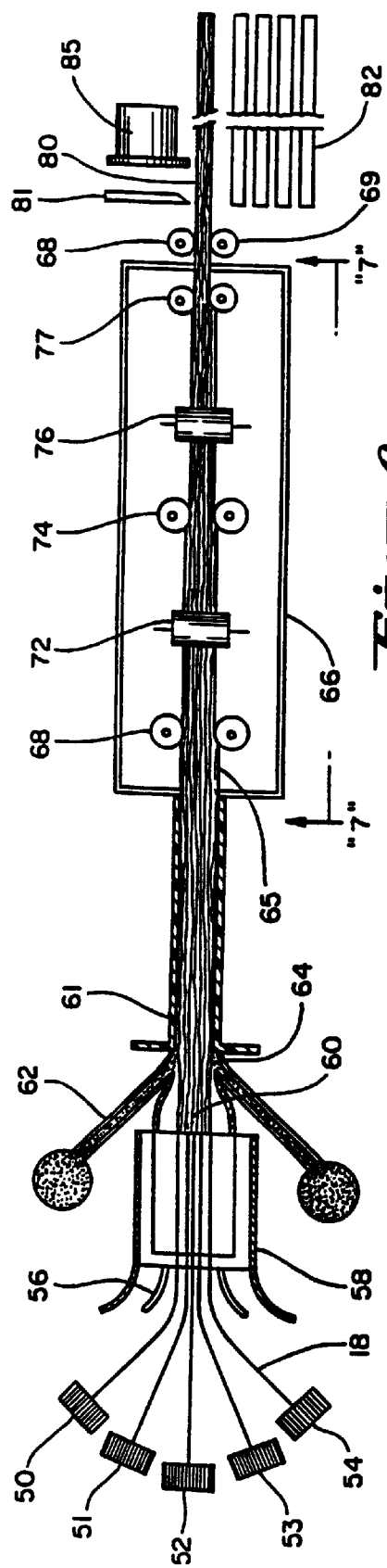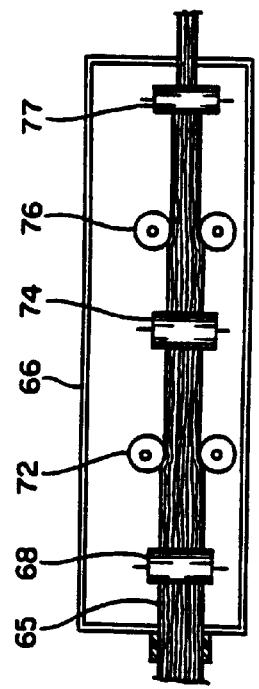

METHOD FOR FABRICATING CARBON-CARBON ARTICLES

BACKGROUND OF THE INVENTION

The present invention relates to the fabrication of internal combustion engine parts from carbon-carbon composites. Carbon-carbon composites are made of carbon fiber reinforced in carbon matrix.

In the past, carbon-carbon parts have been used primarily in aeronautical and space applications because of their light-weight and high temperature properties. However, these characteristics are also extremely beneficial in industrial and automotive engines as evidenced by the fact that aluminum pistons(density $2.7g/cm^3$), which are also lighter than steel($8.0g/cm^3$), but heavier than carbon-carbon($1.7g/cm^3$), have achieved significant commercial success in these markets. However, aluminum has a number of disadvantages. The relative difference in thermal strength and coefficient of thermal expansion of the aluminum pistons with other mating engine components, require large clearances between the piston and the adjacent walls to eliminate interference and galling between the piston and the cylinder wall and the wrist pin. To improve engine efficiency, piston rings are used in these aluminum pistons to seal the gap between the piston and the cylinder wall. In fact, multiple rings with staggering gaps are required to prevent high pressure leakage and possible piston erosion from local high flow rates at the rings, piston and cylinder wall inner face. Because of the poor, high temperature strength of aluminum, it has been found necessary to lower the piston rings from the crown to prevent the rings from sticking in the ring grooves, and this has resulted in unburned hydrocarbon build-up in the space around the piston above the ring yielding reduced engine efficiency, noting that aluminum melts at 660 degrees C(and the maximum application temperature is 300 degrees C), which is well below the typical combustion engine temperature. Also, large amounts of lubricant are required to reduce the piston and cylinder wall temperature and wear rates in aluminum piston assemblies.

The carbon-carbon components are desirable in this environment because of their resistance to high temperature and thermal shocks, coupled with high temperature strength. In some cases, the carbon-carbon piston can eliminate the necessity of piston rings because of the negligible coefficient of thermal expansion of carbon-carbon(1–2 ppm), which is far less than aluminum(18–20 ppm). Even at high temperatures, the carbon-carbon parts uniquely maintain strength, allowing the piston to operate at both higher temperature and higher pressure than metal pistons. Thermal efficiency of the engine is also improved because of the high emittance and low thermal efficiency of carbon-carbon, resulting in less heat loss into the piston and the cooling system.

The carbon fibers in the carbon-carbon composite are known as precursors, and there are three different types; namely, rayon, polyacrylonitrile, and pitch. Rayon has been largely abandoned in recent years because of the resulting poor quality fibers so that today fibers are predominantly made from P.A.N.(polyacrylonitrile) or pitch. P.A.N. is preferred for high strength, whereas pitch derivatives are desirable for high modulus and high thermal conductivity.

In reality, however, the use of carbon-carbon composites in engine components in the industrial and automotive market has not been extensive primarily for two reasons. The first is cost. In the early 1990's, carbon fiber used to cost about $40/lb., and now costs $8–$9/lb., and the near term projections are for under $5/lb. This cost reduction and an increased demand for fibers, which is projected, should drive the fiber cost down further making the carbon-carbon composites a very strong engineering material to replace steel and aluminum in many applications.

The second reason why carbon-carbon composites have not achieved great commercial success is the inability of fabricators to optimize and reduce the cost of the fabrication process. This is due in part to the difficulties in processing techniques to convert the binder to complete carbon which can hold the fibers, so the fibers therein reinforce the binder in such a way to have suitable engineering properties. Traditional processing consists of mixing the fiber with resin and preform into the desired shape. These preforms are kept in a high temperature furnace and heat treated for several hours ranging from 800 to 2000 degrees C. After firing, the composites are placed manually in a CVD furnace and densified. CVD refers to chemical vapor deposition. Due to the nature of CVD, it is extremely difficult to fabricate thick specimens with uniform density. As such, even for thin samples the CVD process takes from a few days to several weeks to finish. The CVD is sometimes replaced by chemical vapor infiltration(CVI), which causes carbon to close on the outside walls of the preform and inhibit penetration to the inside walls. Thus, in addition to high manual time costs, the resulting crusting problem and its removal made these processes highly labor intensive and not conducive to high volume production.

In CVD, hydrocarbon gas is sent through the preform to crack it with high heat. This breaks the carbon down from hydrogen.

The Taylor, U.S. Pat. No. 4,683,809, assigned to NASA, shows a light-weight carbon-carbon piston with no piston rings. The piston is constructed in one piece and the fibers are laid up randomly throughout the piston. The methodology of fiber lay-up tends to disburse the fibers randomly resulting in internal cracks, unreliability, and low strength. The resulting piston component is heavy with poor fracture toughness. Taylor also suggests in this patent a carbon-carbon cylinder wall 60, but is silent as to how the cylinder wall or sleeve is formed or how its performance optimized.

Another Taylor patent, also assigned to NASA, is U.S. Pat. No. 4,736,676, which discloses a composite piston structure including a carbon-carbon or ceramic piston cap 11 with a metallic piston body 13. This piston is quite complicated and too difficult to manufacture in commercial production.

A later Taylor, et al., U.S. Pat. No. 4,909,133, also assigned to NASA, discloses a carbon-carbon piston that has a tubular closed ended knitted preformed sock of carbon fibers 11 imbedded within the matrix of the piston structure on the piston crown side wall in the inside surface.

The Fluga, U.S. Pat. No. 5,154,109, discloses a method of manufacturing a piston and piston rod in which a layer of carbon fibers is triaxially braided on a mandrel with a cylindrical body. A second layer of carbon fibers is triaxially braided over the first layer. The fiber layers are spaced from one another and impregnated with a thermo set resin. The preform is unidirectional in the sense that it does not have a uniform axial diameter. These are extremely difficult to manufacture and difficult to densify using CVD. Furthermore, the design is not flexible because the whole structure is made of one type of material, and thermal expansion is difficult to predict, and in some cases, may expand obliquely.

The U.S. Pat. No. 5,076,872 to Nakagawa, et al., issued Dec. 31, 1991, discloses a system of introducing the fiber reinforcement as well as the resin as fiber form and then are encapsulated by another sheath. This process is complicated and expensive.

The later U.S. Pat. No. 5,206,085 to Nakagawa, et al., issued Apr. 27, 1993, discloses a method to make fiber tows with a thermoplastic sheath and then consolidating the fiber with thermoplastic sheaths. The limitations are that the carbon fibers do not make contact with the other carbon fibers, and the contact is primarily through the thermoplastic sheath. This has two important drawbacks: Since the fibers are not directly consolidated, high strength properties are difficult to achieve and are controlled by the thermoplastic sheath(since each and every fiber tow has to be enclosed in a sheating high fiber, loading becomes difficult and thereby high strength is also difficult; and further, to make thick blocks and low cost fibers, this process becomes expensive since each and every fiber tow has to be sheathed.

The Edie, et al., U.S. Pat. No. 5,334,414, issued Aug. 2, 1994, discloses a system of spreading the carbon fibers and coating the fibers with pitch powder. The concept is to increase the intermixing of fiber and pitch, but the composite cannot maintain the formulations during handling and heat treatment. The resin tends to run off resulting in resin starved composites and thereby poor strength.

Also, Jun Takayasu, et al., issued a paper from the Corporate Research and Development Laboratory, TONEN Corporation, 1-3-Nishi-Tsurugaoka, Ohi-machi, Iruma-gun, Saitama 354, Japan entitled "Mechanical Properties of Unidirectional C/C Composites Prepared Using Matrix Precursor Containing Green Coke as the Main Component", which made the following conclusions:

Unidirectional C/C composites were prepared, without the conventional densification cycles, from prepregnated sheets consisting of mesophase pitch-based carbon fiber with high to ultra-high modulus(FORCA FT-500 or FT-700), and with or without surface treatment), and a matrix precursor containing green petroleum coke as the main component. Effects of the properties of carbon fiber and the heat treatment temperature (HTT) were studied on mechanical properties such as tensile strength aND interlamina shear strength (ILSS) of the components. Above 1200 degrees C the higher the HTT, the higher was the tensile strength of the C/C composite, regardless of the type of carbon fiber used, and reached a level of 800–900 MPa at 2000 degrees C and 2500 degrees C, when the fiber volume fractions and bulk densities of the composites were between 42% and 48%, and between 1.71 and 1.85 g/cm$^3$, respectively. The Young's modulus monotonically increased with increasing HTT for all four kinds of composite. On the other hand, below 2000 degrees C, the higher the HTT, the higher was the ILSS. Above 2000 degrees C, the ILSS decreased with an increase in the HTT. The maximum value of ILSS was 28MPa. These mechanical properties were considered from the interfacial behavior and the microstructure observed.

The process described in this paper, while technically detailed, continues the slow present manual fabrication methodology for carbon-carbon components.

It is a primary object of the present invention to ameliorate the problems noted above in the fabrication of carbon-carbon components, and the resulting carbon-carbon piston articles by providing continuous flow fabrication of carbon-carbon components intended for high temperature environments.

SUMMARY OF THE PRESENT INVENTION

In accordance with the present invention, a method is provided of fabricating carbon-carbon pistons and a limited variety of other products also requiring lightweight high strength and high thermal stability, and the resulting piston articles, including the steps of feeding impregnated fibers from spools into a layered bundle of fibers, coating the fibers with a carbonaceous material to form a preform, sleeving the preform with a thermoplastic sleeve, extruding the coated preform, passing the preform through an oven while compacting the preform further, and cutting the preform into standard lengths as the preform exits the furnace and achieves a degree of cool down. The pistons are machined from the cut blocks with the piston axis parallel to the fibers and layers. The pistons include crown, skirt, and wrist pin bosses and the axis of the wrist pin bosses is perpendicular to the fibers and layers.

This process is a continuous one offering substantial volume and cost savings. Carbon fibers in any of the following stages such as partially stabilized PAN, Pitch, high strength PAN or high modulus pitch or a hybrid of fibers are coated with a combination of carbonaceous resin systems. A carbonaceous resin system is formed by combining carbon fillers such as green carbon coke, petroleum coke or carbon fillers with a carbonaceous resin such as phenolic resin, pitch or high char yielding resin. The preform(fiber coated with a carbonaceous resin system maintained at a fixed formulation) is continuously fed through a vacuum oven and subsequently encapsulated in a thermoplastic sheath before entering the furnace. The thermoplastic sheath protects the preform and maintains the formulation. The thermoplastic sheath can be made of any commercially available resin or films such as Nylon, Polyphenylene sulphide, Poly ether, ether ketone or similar systems thereof. The prepared preform(i.e. coated carbon fiber bundles) is extruded through a rectangular or cylindrical die and then fed into a furnace through a set of rollers with increasing pressure and temperatures up to 2500 degrees C in an inert environment. The tension and the pressure created by the pulling action of the rollers are critical in improving the strength and density of the resulting composite. A similar gradient from high pressure and temperature to room temp and pressure are maintained on the other side of the furnace for the preform to cool. The preform goes into the furnace and comes out as finished C—C composite rectangular or cylindrical blocks. The blocks can be made to any size in order to match the piston bore requirements. The C—C blocks are then cut into desired lengths and finished into pistons as shown in the drawings.

The advantages realized by this process for making C—C composites are: A true continuous process capable of producing high volume output with a substantial cost savings. Presently C—C composites are produced as a batch process. As a result the furnace has to be stopped and started and the down time and furnace cooling time hamper productivity and thus the cost of the raw materials. A true one step process is now provided as the material goes through the furnace and comes out as a finished product, cutting down many manual hours. Desired material properties can be tailored by the choice of fibers and carbonaceous resin system. Any size piston can be manufactured without changing the set-up, thus offering product flexibility. Pre-stretched fibers and low temperature heat-treated fibers can be used effectively thereby reducing the composites cost even lower. Any fiber such as Si, SiC etc. can be incorporated in the preform to achieve any particular property desired.

The carbon-carbon pistons that are made from the carbon-carbon continuous fabrication process described above are machined with the fibers running parallel to the axis of the pistons and as a result thermal and mechanical strengths are greatly improved. Due to this approach, several additional advantages of the carbon-carbon pistons are realized as follows:

One can make shorter stroke pistons compared to aluminum pistons. This leads to light weight, compact engines with more horsepower for the same engine capacity. Since C—C pistons are 30% lighter than aluminum pistons, engines with C—C pistons can achieve higher RPM and can move the piston ring land close to the crown and in some cases eliminate piston rings. Engine can now run hotter and better thermally managed to suit the application. Reduced oil consumption can result and possibly eliminate oil cooling. Since metals do not stick to carbon, ring welding and piston seizure will be completely eliminated. Reduced oil consumption, better fit in the cylinder bore and hotter engine temperature will substantially reduce hydrocarbon emissions without any other engineering modifications. Thus substantial cost savings result. As these composites are self-lubricious with lower thermal expansion, better tolerances can be obtained. This leads to better cold start performance and reduced noise pollution. These pistons will enable two stroke engines to run without oil-mixing and piston seizure; this will make two stroke engines very attractive candidates compared to four stroke engines. All these improvements will result in overall superior engine performance with substantially improved reliability. As these pistons can run at close tolerances, high combustion pressure can be achieved without blowby. When combined with high temperature strength, the pistons will substantially improve diesel engine performance and other direct fuel injection systems. There is a shift toward running 2 stroke engines with stratified charge and DFI systems for controlling emissions. As a result, these engines operate at higher temperature than conventional aluminum pistons. In this application, C—C pistons will be a suitable candidate.

An important aspect of the present invention is that the wrist pin holes through the piston have their common axis perpendicular to the piston laminations and the fiber direction. Thus, they tend to withstand higher static and fatigue/cycle loadings even at high temperature. Further, the wrist pin holes can be moved closer to the crown which is not possible in aluminum pistons(heat softens the wrist pin boss in aluminum, and thus forces the wrist pin down; resulting in heavier and longer pistons).

The pistons resulting from this method can also be used in conventional engines by retrofitting with a carbon-carbon cylinder liner and a composite wrist pin. This design is suitable for both two cycle and four cycle gasoline and diesel engines and also compressors, or any expanding chamber device. This design is especially suited for applications where high performance and reliability is warranted.

BRIEF DESCRIPTION OF THE DRAWINGS

FIG. 6 is a schematic view of the continuous flow fabrication method according to the present invention, and;

FIG. 7 is a fragmented orthogonal view of the furnace illustrated in FIG. 6.

DETAILED DESCRIPTION OF THE PREFERRED EMBODIMENT

Figure 1:
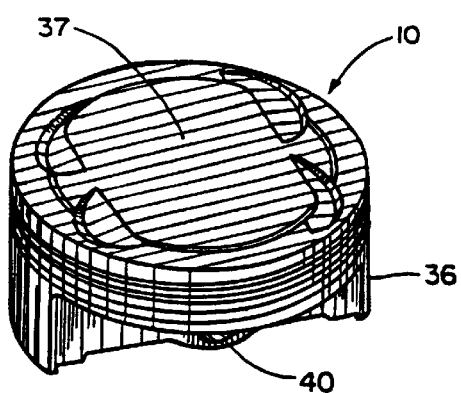
FIG. 1 is a perspective view of a piston machined in accordance with the present fabrication method.
Figure 2:
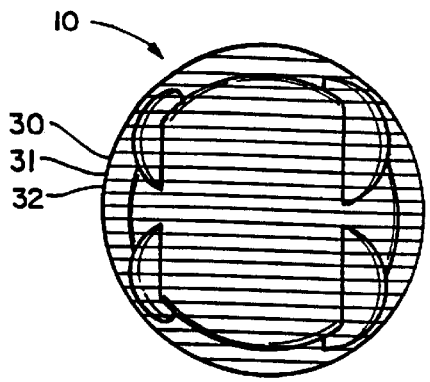
FIG. 2 is a top view of the piston illustrated in FIG. 1.
Figure 4:
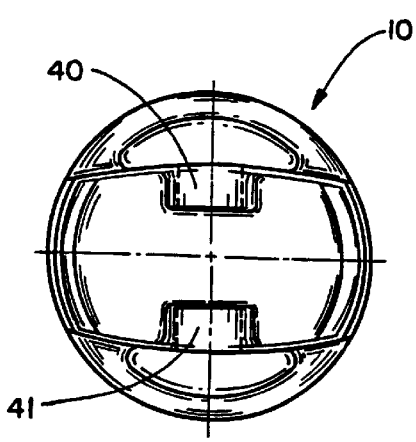
FIG. 4 is a bottom view of the piston illustrated in FIGS. 1 and 2.
Figure 3:
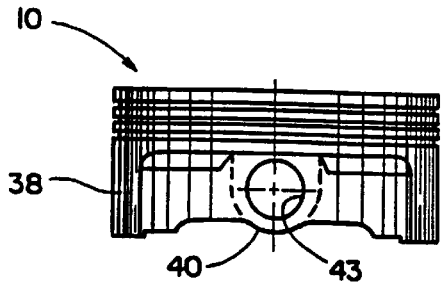
FIG. 3 is a side view of the piston illustrated in FIGS. 1 to 4.

Referring to the drawings and particularly FIGS. 1 to 5, a carbon-carbon piston 10 is illustrated manufactured from a rectangular preform 12 that results from the continuous flow fabrication method illustrated in FIGS. 6 and 7. The preform 12 includes a plurality of layers 13, 14, 15, 16, etc. that run in a parallel fashion axially in the preform 12. Each of the layers 13 is filled with unidirectional fibers 18 that also run axially through preform 12.

It should be understood that while the preform 12 is rectangular in configuration, it also could have other geometrical configurations such as rectangular, cylindrical or elliptical. The preform is severed into a plurality of blocks 20, 21 and 22 that are selected in axial length to accommodate the length of the pistons 10 while minimizing waste. The cylindrical sub-blocks from which the pistons are to be machined are indicated at 24 and 25 in block 22, and as seen, they are machined so that the layers 13, 14, 15, 16, etc. are parallel to the proposed axis of the piston 10 with the fibers 18 running axially through the piston. These layers are indicated, for example, at 30, 31, 32, etc. in FIG. 2.

The piston 10 is seen to include a piston body 36 having a contoured crown 37, a segmented depending integral frusto annular skirt 38, and a pair of spaced wrist pin bosses 40 and 41. Bosses 40 and 41 have coaxial bores 43.

The orientation of the wrist pin bores 43 perpendicular to the fiber direction and layers permits the transfer of heat very effectively and controls engine temperature. Furthermore, since the wrist pin bores are made along the thickness, they tend to withstand higher static and heat cycle loads even at high temperatures. This permits the wrist pin bores to be moved closer to the crown which reduces piston length.

After the pistons are machined, the crown can be coated with Si, Cu, Ni or any other commercial coatings if desired.

In addition to short stroke pistons, the present piston can also be used in conventional engines and can be retrofitted with a carbon-carbon liner and a composite wrist pin. This design is suitable for two cycle and four cycle gasoline engines and diesel engines, and also air compressors, or any expanding cylinder device.

Figure 5:
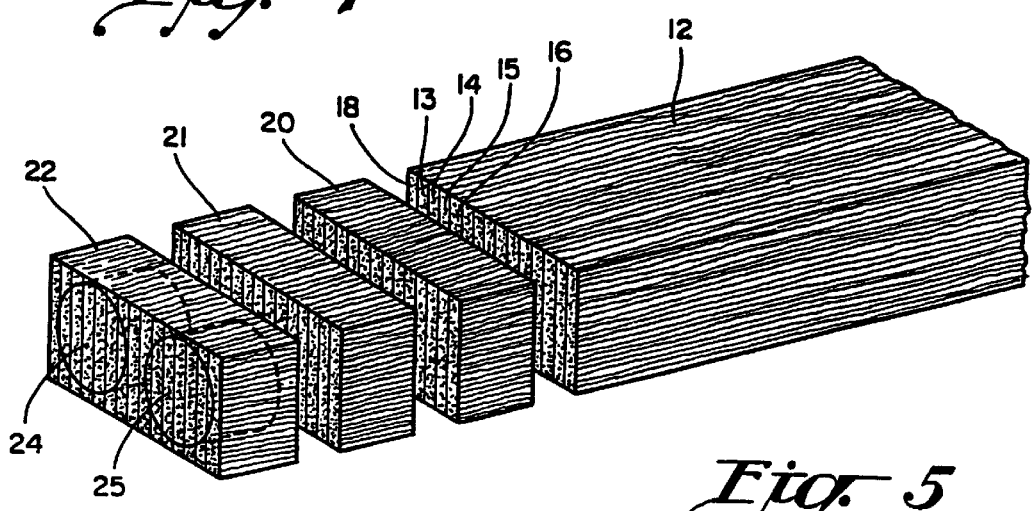
FIG. 5 is a perspective view of a preform made in accordance with the present fabrication method illustrating the machining orientation of two pistons.

The method of fabricating the preform 12 in FIG. 5 is illustrated in FIGS. 6 and 7 and can be seen to be a continuous method.

Fibers 18 are fed into the system continuously from a plurality of fiber spools 50, 51, 52, 53 and 54. The carbon fibers employed are partially stabilized PAN or pitch, high strength PAN or high modulus pitch or a hybrid of fibers.

The fibers 18 are guided by curved entry plates 56 into a coating tray 58 containing a combination carbonaceous resin system. This is in powder form and is made by combining carbon fillers such as green carbon coke, petroleum coke, or carbon fillers with a carbonaceous resin such as phenolic resin, pitch or high char yielding resin. The coated fiber bundle indicated at 60 is maintained at a fixed formulation as it enters an elongated extrusion die 61. Die 61 forms the basic shape of the preform; i.e., rectangular, circular, or square, etc., and it also serves to provide the initial compression of the coated fiber bundle 60, such compression being effected in stages according to the present invention.

A powdered film material supply system 62 applies a film to the circumference of the tube bundle 60 at 64 immediately upstream of the extrusion die 61. The resulting thermoplastic sheath surrounding the preform is indicated at 65, and it protects the preform and assists in maintaining the preform formulation. This sheath can be made from any commercially available resin such as nylon, polyphenylene sulphide, poly ether, ether ketone or similar materials.

As the preform leaves the elongated extrusion die 61, and enters the elongated furnace 66, it is compressed further by a pair of opposed compression rollers 68 which further densify the preform. Furnace 66 has an inert atmosphere and a temperature in the range of 1200 to 2500 degrees C. A pair of feed rollers 68 and 69 outboard of the furnace 66 feed the preform, and also exert(with the compression rollers) a tension force on the preform that is important in improving the strength and density of the resulting composite.

A second set of compression rollers 72 are orthogonally positioned with respect to compression rollers 68 and further densify and compress the preforms. Subsequent orthogonally related compression rollers 74, 75, 76, and 77 achieve the final high density configuration of the preform. It should be understood that additional feed rollers 68 and could be provided, some within the furnace 66 if desired.

The exiting preform indicated at 80 is cut into standard lengths 82 by a knife system 81 that includes an axially reciprocating carrier 85 that enables knife 81 to cut the preform on the fly so that the preform running through the fabrication system never stops.

At the exit of the furnace 66, a small gradient from high pressure and temperature to room temperature and pressure is maintained as the preform cools. The standard length preforms 82 are then cut into the blocks 20, 21, and 22 illustrated in FIG. 5, from which the piston machining blocks 24 and 25 are cut.

What is claimed is:

1. A method of fabricating a heavy carbon-carbon (C—C) preform, including the steps of feeding a plurality of impregnated carbon fibers in an axial direction to form a fiber bundle, coating the fiber bundle with a carbonaceous material while the fiber bundle is moving thereby forming a preform, sleeving the preform with a thermoplastic sheath, extruding the sleeved preform, and compressing the preform while feeding the preform through a furnace to pyrolize the preform, said step of compressing being at least partly in the furnace.

2. A method of fabricating a carbon-carbon (C—C) preform as defined in claim 1, wherein the step of compressing the preform includes passing the preform through an extrusion die.

3. A method of fabricating a carbon-carbon (C—C) preform as defined in claim 1, including the step of stretching the preform in the furnace to increase fiber strength.

4. A method of fabricating a carbon-carbon (C—C) preform as defined in claim 1, including the step of cutting the preform into desired lengths as the preform exits the furnace.

5. A method of fabricating a carbon-carbon (C—C) preform, including the steps of feeding a plurality of impregnated carbon fibers in an axial direction to form a fiber bundle, coating the fiber bundle with a carbonaceous material while the fiber bundle is moving thereby forming a preform, sleeving the preform with a thermoplastic sheath, extruding the sleeved preform, compressing the preform while moving both prior to and while pyrolizing, and feeding the preform through a furnace to pyrolize the preform, the step of coating the impregnated fibers including feeding the fibers through a tray of powdered carbonaceous material.

6. A method of fabricating a carbon-carbon (C—C) preform, including the steps of feeding a plurality of impregnated carbon fibers in an axial direction to form a fiber bundle, coating the fiber bundle with a carbonaceous material while the fiber bundle is moving thereby forming a preform, sleeving the preform with a thermoplastic sheath, extruding the sleeved preform, compressing the preform while moving both prior to and while pyrolizing, and feeding the preform through a furnace to pyrolize the preform, the step of compressing the preform including passing the preform through compression rollers.

7. A method of fabricating a carbon-carbon (C—C) preform, including the steps of feeding a plurality of impregnated carbon fibers in an axial direction to form a fiber bundle, coating the fiber bundle with a carbonaceous material while the fiber bundle is moving thereby forming a preform, sleeving the preform with a thermoplastic film to improve stability, extruding the sleeved preform, compressing the preform while moving both prior to and while pyrolizing, and feeding the preform through a furnace to pyrolize the preform.

8. A method of fabricating a carbon-carbon (C—C) preform, including the steps of feeding a plurality of impregnated carbon fibers in an axial direction to form a fiber bundle, coating the fiber bundle while the fiber bundle is moving forming a preform, compressing the preform while moving either prior to or while pyrolizing, and feeding the preform through a furnace to pyrolize the preform, the step of coating the impregnated fibers including feeding the fibers through a tray of powdered carbonaceous material before the preform enters the furnace.

9. A method of fabricating a heavy carbon-carbon (C—C) preform including the steps of feeding a plurality of impregnated carbon fibers in an axial direction to form a fiber bundle, coating the fiber bundle with a carbonaceous material while the fiber bundle is moving thereby forming a preform, sleeving the preform with a thermoplastic sheath, extruding the sleeved preform, and compressing the preform while feeding the preform through a furnace to pyrolize the preform, said step of compressing being at least partly in the furnace, the step of compressing the preform also including passing the preform through an extrusion die after coating the fibers and before the preform enters the furnace.

10. A method of fabricating a carbon-carbon (C—C) preform including the steps of feeding a plurality of impregnated carbon fibers in an axial direction to form a fiber bundle, coating the fiber bundle with a carbonaceous material while the fiber bundle is moving thereby forming a preform, sleeving the preform with a thermoplastic sheath, extruding the sleeved preform, compressing the preform while moving both prior to and while pyrolizing, and feeding the preform through a furnace to pyrolize the preform, the step of compressing the preform including passing the preform through compression rollers at least partly while the preform is moving through the furnace.

11. A method of fabricating a carbon-carbon (C—C) preform including the steps of feeding a plurality of impregnated carbon fibers in an axial direction to form a fiber bundle, coating the fiber bundle with a carbonaceous material while the fiber bundle is moving thereby forming a preform, sleeving the preform with a thermoplastic sheath, extruding the sleeved preform, compressing the preform while moving both prior to and while pyrolizing, and feeding the preform through a furnace to pyrolize the preform.

12. A method of fabricating a carbon-carbon (C—C) preform, including the steps of feeding a plurality of impregnated carbon fibers in an axial direction to form a fiber bundle, coating the fiber bundle with a carbonaceous material while the fiber bundle is moving thereby forming a preform, sleeving the preform with a thermoplastic sheath, extruding the sleeved preform, compressing the preform while moving both prior to and while pyrolizing, feeding the preform through a furnace to pyrolize the preform, the step of coating the impregnated fibers including feeding the fibers through a tray of powdered carbonaceous material, the step of compressing the preform including passing the preform through an extrusion die, and the step of compressing also including passing the preform through compressor rollers.

13. A method of fabricating a carbon-carbon (C—C) preform, including the steps of feeding a plurality of impregnated carbon fibers in an axial direction to form a fiber bundle, coating the fiber bundle with a carbonaceous material while the fiber bundle is moving thereby forming a preform, sleeving the preform with a thermoplastic sheath, extruding the sleeved preform, compressing the preform while moving both prior to and while pyrolizing, feeding the preform through a furnace to pyrolize the preform, the step of compressing includes passing the preform through an extrusion die, and the step of compressing the preform including passing the preform through compressor rollers.

14. A method of fabricating a carbon-carbon (C—C) preform, including the steps of feeding a plurality of impregnated carbon fibers in an axial direction to form a fiber bundle, coating the fiber bundle with a carbonaceous material while the fiber bundle is moving thereby forming a preform, sleeving the preform with a thermoplastic sheath, extruding the sleeved preform, compressing the preform while moving both prior to and while pyrolizing, feeding the preform through a furnace to pyrolize the preform, and cutting the preform into desired lengths as the preform exits the furnace.

15. A method of forming a high strength and high thermal conductivity carbon-carbon piston, including the steps of feeding a plurality of impregnated carbon fibers in an axial direction to form a fiber bundle, coating the fiber bundle with a carbonaceous material while the fiber bundle is moving thereby forming a preform, sleeving the preform with a thermoplastic sheath, extruding the sleeved preform, compressing the preform while moving both prior to and while pyrolizing, feeding the preform through a furnace to pyrolize the preform, cutting the preform into desired lengths as the preform exits the furnace, and machining the preform to form carbon-carbon pistons.

16. A method of forming a high strength and high thermal conductivity carbon-carbon piston as defined in claim 15, said piston body being formed of layers of fiber and carbonaceous material, said wrist pin bosses having coaxial bores with an axis, said wrist pin bores axis being perpendicular to the layers and fibers to achieve greater wrist pin boss strength.

17. A method of forming a high strength and high thermal conductivity carbon-carbon piston, including the steps of feeding a plurality of impregnated carbon fibers in an axial direction to form a fiber bundle, coating the fiber bundle with a carbonaceous material while the fiber bundle is moving thereby forming a preform, sleeving the preform with a thermoplastic sheath, extruding the sleeved preform, compressing the preform while moving both prior to and while pyrolizing, feeding the preform through a furnace to pyrolize the preform, cutting the preform into desired lengths as the preform exits the furnace, machining the preform to form carbon-carbon pistons, the step of compressing including passing the preform through an extrusion die, and the step of compressing the preform including passing the preform through compression rollers.

18. A method of forming a high strength and high thermal conductivity carbon-carbon piston, including the steps of feeding a plurality of impregnated carbon fibers in an axial direction to form a fiber bundle, coating the fiber bundle with a carbonaceous material while the fiber bundle is moving thereby forming a preform, sleeving the preform with a thermoplastic sheath, extruding the sleeved preform, compressing the preform while moving both prior to and while pyrolizing, feeding the preform through a furnace to pyrolize the preform, cutting the preform into desired lengths as the preform exits the furnace, machining the preform to form a carbon-carbon piston, and cutting the preform into desired lengths as the preform exits the furnace.

* * * * *